(12) United States Patent
Hugues et al.

(10) Patent No.: US 10,363,507 B2
(45) Date of Patent: Jul. 30, 2019

(54) FILTER HOUSING

(71) Applicant: Camfil AB, Stockholm (SE)

(72) Inventors: Mathieu Hugues, Trosa (SE); Stefan Ljungström, Vagnhärad (SE)

(73) Assignee: Camfil AB, Stockholm (SE)

( * ) Notice: Subject to any disclaimer, the term of this patent is extended or adjusted under 35 U.S.C. 154(b) by 131 days.

(21) Appl. No.: 15/508,466

(22) PCT Filed: Sep. 3, 2015

(86) PCT No.: PCT/SE2015/050933
§ 371 (c)(1),
(2) Date: Mar. 2, 2017

(87) PCT Pub. No.: WO2016/036307
PCT Pub. Date: Mar. 10, 2016

(65) Prior Publication Data
US 2017/0274307 A1      Sep. 28, 2017

(30) Foreign Application Priority Data

Sep. 4, 2014 (SE) ...................................... 1451031
Sep. 4, 2014 (SE) ...................................... 1451032

(51) Int. Cl.
*F24F 3/16* (2006.01)
*B01D 46/00* (2006.01)
(Continued)

(52) U.S. Cl.
CPC ....... *B01D 46/001* (2013.01); *B01D 46/0097* (2013.01); *F24F 3/161* (2013.01);
(Continued)

(58) Field of Classification Search
CPC .............. B01D 46/0005; B01D 46/001; B01D 46/0097; B01D 2297/51; F24F 3/161; F24F 13/085; F24F 13/28; F24F 2221/14
See application file for complete search history.

(56) References Cited

U.S. PATENT DOCUMENTS 3,782,082 A   1/1974   Smith et al.
3,812,370 A   5/1974   LaViolette
(Continued)

FOREIGN PATENT DOCUMENTS

CA   2507350 A1   11/2006
DE   8808009 U1   8/1988
(Continued)

OTHER PUBLICATIONS

English language machine translation of FR 2809142. Retrieved from http://translationportal.epo.org on Oct. 4, 2018. (Year: 2018).*
(Continued)

*Primary Examiner* — Jason M Greene
(74) *Attorney, Agent, or Firm* — Knobbe, Martens, Olson & Bear, LLP

(57) ABSTRACT

The present invention relates to an air filter housing for supplying air to a space, said air filter housing being configured to be arranged in a ceiling of said space, said housing having a mouth facing downward, said mouth comprising a sealing surface configured to receive a panel type air filter comprising a frame and a filter medium held within said frame, such that a sealing connection between said sealing surface and said frame is achieved, characterized in that said filter housing further comprises at least one resilient member arranged below the sealing surface such that when a panel type air filter is inserted into the mouth, the resilient member will be deformed by the filter frame as the filter passes the resilient member, and resume its original shape once the filter has passed, such that the filter is (Continued)

retained between the sealing surface and the resilient member. The present invention further relates to the use of a filter housing in a cleanroom, and to a method of mounting a panel type air filter in an air filter housing.

5 Claims, 6 Drawing Sheets

(51) Int. Cl.
*B01D 46/18* (2006.01)
*F24F 13/08* (2006.01)
*F24F 13/20* (2006.01)
*F24F 13/28* (2006.01)

(52) U.S. Cl.
CPC ............ *F24F 13/08* (2013.01); *F24F 13/085* (2013.01); *F24F 13/28* (2013.01); *B01D 46/185* (2013.01); *B01D 2279/51* (2013.01); *F24F 3/16* (2013.01); *F24F 2013/205* (2013.01); *F24F 2221/14* (2013.01)

(56) References Cited

U.S. PATENT DOCUMENTS

| | | |
|---|---|---|
| 4,518,405 A | 5/1985 | Lough et al. |
| 4,946,484 A | 8/1990 | Monson et al. |
| 5,556,222 A | 9/1996 | Chen |
| 5,871,556 A | 2/1999 | Jeanseau et al. |
| 6,190,431 B1 * | 2/2001 | Jeanseau ............ B01D 46/0005 454/187 |
| 6,267,793 B1 * | 7/2001 | Gomez ................ F24F 13/28 454/187 |
| 2003/0150196 A1 | 8/2003 | Duffy |
| 2009/0242476 A1 | 10/2009 | Muenkel et al. |
| 2012/0060454 A1 * | 3/2012 | Banks ................ B01D 46/0005 55/493 |
| 2013/0091811 A1 * | 4/2013 | Morgan ............ B01D 46/0005 55/341.1 |

FOREIGN PATENT DOCUMENTS

| | | | |
|---|---|---|---|
| FR | 1324386 A | 4/1963 | |
| FR | 2448380 A1 | 9/1980 | |
| FR | 2809142 | * 11/2001 | ............. F24F 13/28 |
| JP | 60-71833 A | 4/1985 | |
| JP | 405010904 Y | 7/1990 | |
| JP | H0291622 | 7/1990 | |
| JP | H05-10904 | 1/1993 | |
| JP | 2001-336815 A | 12/2001 | |
| JP | 2011-047603 A | 3/2011 | |
| WO | WO 97/23748 | 7/1997 | |
| WO | WO 2010/149228 | 12/2010 | |

OTHER PUBLICATIONS

Extended European Search Report for Application No. 15838459.4 dated Mar. 26, 2018 in 8 pages.
International Search Report and Written Opinion for International Application No. PCT/SE2015/050933 dated Dec. 21, 2015 in 13 pages.
International Search Report and Written Opinion for International Application No. PCT/SE2015/050932 dated Dec. 22, 2015 in 12 pages.

* cited by examiner

FILTER HOUSING

TECHNICAL FIELD

The present invention relates to filter housings for horizontally mounted panel type air filters, typically ceiling air filter housings, e.g. for use in cleanroom facilities or other spaces requiring air filtration.

BACKGROUND OF THE INVENTION

Cleanrooms are used, for example, in pharmaceutical and microelectronics manufacturing facilities and in hospitals to provide an atmosphere uncontaminated by dust, pollen, bacteria, molecular pollution, and the like.

Cleanrooms typically comprise a sealed space to which filtered air is supplied by an air circulating system. In order to remove airborne contaminants the air is passed though one or more air filters before it enters the cleanroom. The air then leaves the room through outlet or exhaust filters mounted in a wall near the floor of the room, or in the floor itself.

The inlet air filters are typically mounted filter housings in the ceiling of the cleanroom or in a false ceiling which is suspended from the ceiling of the cleanroom.

The filter housings may for example be arranged in an open gridwork in the ceiling, wherein the grid openings are configured to accommodate the filter housings.

The filter housings are connected through ducts or a plenum to a fan which transports air through the filters into the cleanroom. The air filters are typically panel type HEPA, ULPA or molecular filters comprising substantially rectangular metal, wood or plastic frame in which the filter medium is sealed.

To prevent intrusion of contaminants into the cleanroom, the connection between the air filter and the filter housing must be leak proof so that all outside air and/or recirculated air passes through the filter. A leak proof connection is typically achieved by a flange in the filter housing connecting to a surface on the filter frame, or vice versa. The filter panel is typically secured in a sealing connection with the filter housing using a number of bolts or nuts.

The inlet air filters must be replaced on a regular basis. Changing filters is typically done from the cleanroom side and involves substantial manual work in awkward positions. Cleanrooms can also be very large, which means that the number of filters to be replaced can be substantial. The awkward work of mounting filters in the filter housings also increases the risk of damage to the new filter as it is being mounted.

SUMMARY OF THE INVENTION

An objective of the present invention is to provide an air filter housing, particularly a ceiling mounted air filter housing for horizontally mounted panel type air filters, which facilitates filter replacements. This in turn can reduce down time required for filter exchange as well as improve the working environment of the personnel tasked with the filter replacement. Another object of the present invention is to reduce the risk of damage to the new filter when it is being mounted.

According to aspects illustrated herein, there is provided an air filter housing for supplying air to a space, said air filter housing being configured to be arranged in a ceiling of said space, said housing having a mouth facing downward, said mouth comprising a sealing surface configured to receive a panel type air filter comprising a frame and a filter medium held within said frame, such that a sealing connection between said sealing surface and said frame is achieved, characterized in that the filter housing further comprises at least one resilient member arranged below the sealing surface such that when a panel type air filter is inserted into the mouth, the resilient member will be deformed by the filter frame as the filter passes the resilient member, and resume its original shape once the filter has passed, such that the filter is retained between the sealing surface and the resilient member.

The filter housing is suitable for supplying air to, for example, a cleanroom or a controlled atmosphere bench unit. The filter housing is particularly useful in cleanrooms.

The filter housing typically has the shape of a rectangular or square box having an upper portion and a lower portion. The lower portion comprises a rectangular or square opening referred to herein as the mouth, arranged to face the room side. The upper portion arranged to face the ceiling side comprises a plenum connecting the lower portion to an air inlet. The panel type filter is mounted in a generally horizontal orientation in the lower portion of the filter housing.

In some embodiments the filter housing comprises an assembly of two or more lower portions arranged side by side in a horizontal plane and having a common upper portion, or plenum, connecting all of the lower portions to a common air inlet.

In some embodiments the filter housing comprises an integral blower or fan unit. Such filter housings are commonly referred to as fan filter units (FFU). Sealing of the filter against the filter housing is typically achieved by means of a sealing material arranged between the filter frame and the sealing surface. The sealing material may be arranged on the filter frame or on the sealing surface such that when the filter frame and the sealing surface are clamped together, a leak proof seal is formed between the filter frame and the filter housing. The sealing material may for example be in the form of an elastically deformable polymeric material, for example a polyurethane gasket, or in the form of a plastically deformable material, for example a gel type sealing material.

In some embodiments, a knife seal is used. In this type of seal, also known as a gel seal, one of the surfaces to be clamped together comprises a protruding ridge, the knife, substantially parallel to the air flow direction, and the other surface comprises a matching groove containing a deformable sealing material, for example a gel type sealing material. When the two surfaces are clamped together, the knife is embedded in the deformable sealing material to form a leak proof seal. The knife may be arranged on the filter housing and the groove on the filter frame, or vice versa.

The filter housings according to the present invention are advantageous in that they comprise a resilient member which acts to temporarily retain the filter in position for clamping and sealing before the filter is secured in a sealing connection with the filter housing using clamping means, such as bolts or nuts. This greatly facilitates the work associated with filter replacement. This in turn can reduce down time required for filter exchange as well as improve the working environment of the personnel tasked with the filter replacement. This also allows for a more controlled clamping of the filter, which reduces the risk of mistakes or accidental damage to the new filter when it is being mounted.

The resilient members are also functional during removal of the filter. During removal the resilient members act to receive the filter when clamping is released such that the filter can not fall or hang in a way that could otherwise cause damage to the filter housing. When clamping has been fully released, the filter may instead be removed in a controlled manner by depressing the resilient members.

The resilient member is typically a plastic or metal element having a resilient portion capable of being deformed when pressure is applied and resuming its original shape when the pressure is removed. The resilient portion typically has a deflecting surface and a retaining surface on which the filter frame can rest once the filter frame has passed and the resilient member has resumed its original shape. The resilient portion is typically shaped such that it will deform to allow the filter frame to pass from below, but not from above, such that once the filter has passed the resilient members, it is retained between the sealing surface and the resilient members. When the filter is to be removed, the resilient members can be deformed manually to allow the filter to pass.

In some embodiments the mouth of the air filter housing comprises at least two resilient members arranged at opposite sides of the mouth below the sealing surface such that when a panel type air filter is inserted into the mouth, both resilient members will be deformed by the filter frame as the filter passes the resilient members, and resume their original shape once the filter has passed, such that the filter is retained between the sealing surface and the resilient members.

In some embodiments the air filter housing comprises a first and a second fastening position for each resilient member, whereby said first and second fastening position result in different distances between the resilient member and the sealing surface, so as to accommodate panel type air filters having a first and second filter thickness respectively.

In some embodiments the air filter housing further comprises clamping means, including one or more clamping devices, configured for securing the frame of the panel type air filter against the sealing surface, such that a sealing connection between the frame and the housing is achieved.

In some embodiments, the clamping means may comprise a clamping device having a cam mechanism configured to displace the frame when activating the cam mechanism, thereby providing clamping of said filter frame against the sealing surface. In some embodiments the clamping means comprises four clamping devices, arranged at two and two at opposite sides of the mouth below the sealing surface According to further aspects illustrated herein, there is provided the use of an air filter housing according to claim 1 in a cleanroom.

According to further aspects illustrated herein, there is provided a method of mounting a panel type air filter in an air filter housing, the method comprising the steps of:

a) inserting a panel type air filter into the mouth of the air filter housing such that the resilient member is deformed by the filter frame as the filter passes the resilient member, and resume its original shape once the filter has passed, such that the filter is retained between the sealing surface and the resilient member, and b) securing the frame of the panel type air filter against the sealing surface using the clamping means, such that a sealing connection between the frame and the housing is achieved.

BRIEF DESCRIPTION OF THE DRAWINGS

An embodiment of the invention will now be described with reference to the accompanying drawings in which the same elements are numbered alike.

DETAILED DESCRIPTION

Figure 1A:
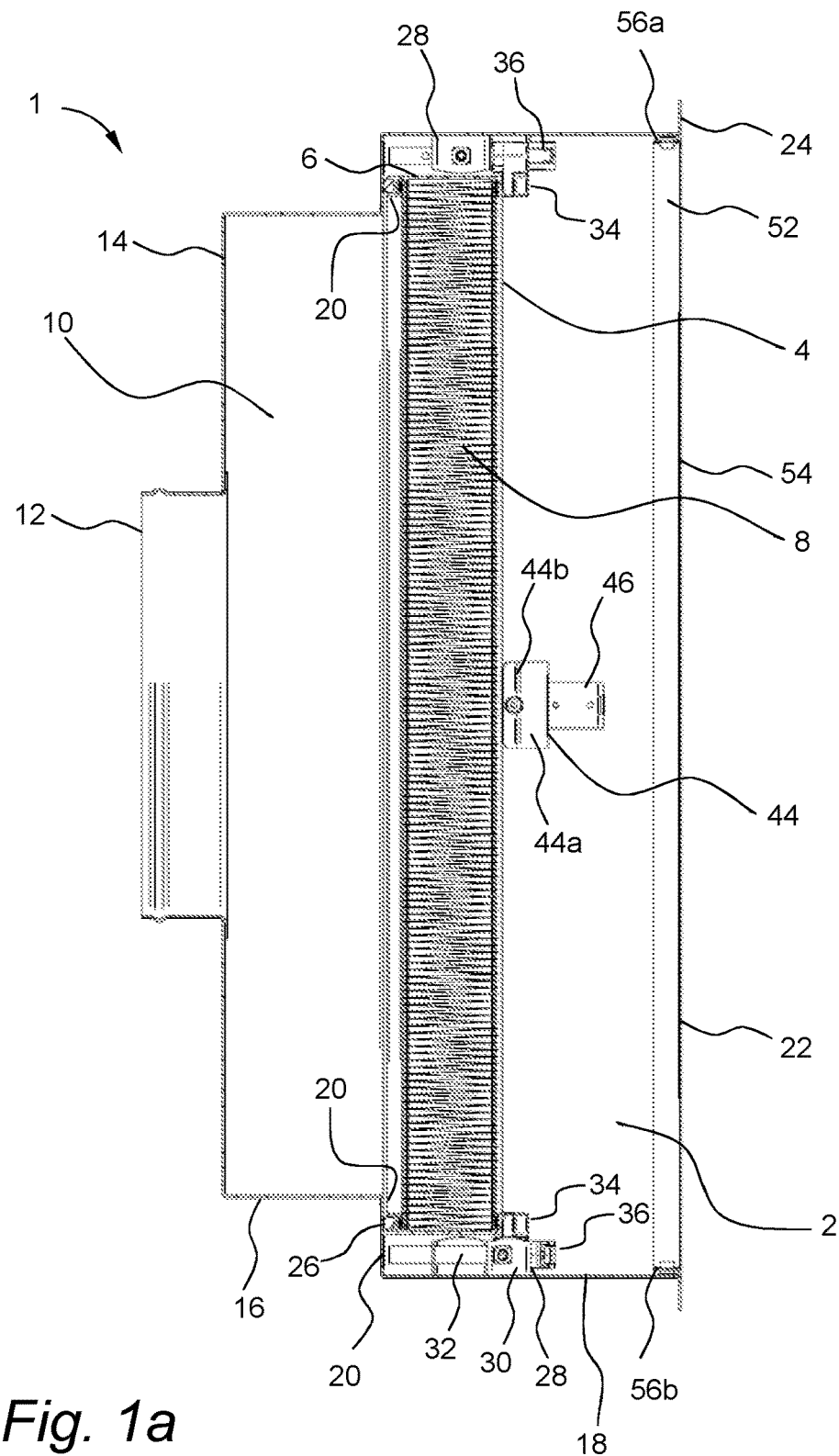
FIGS. 1a and 1b are different cross-sectional views of an embodiment of the filter housing.
Figure 1B:
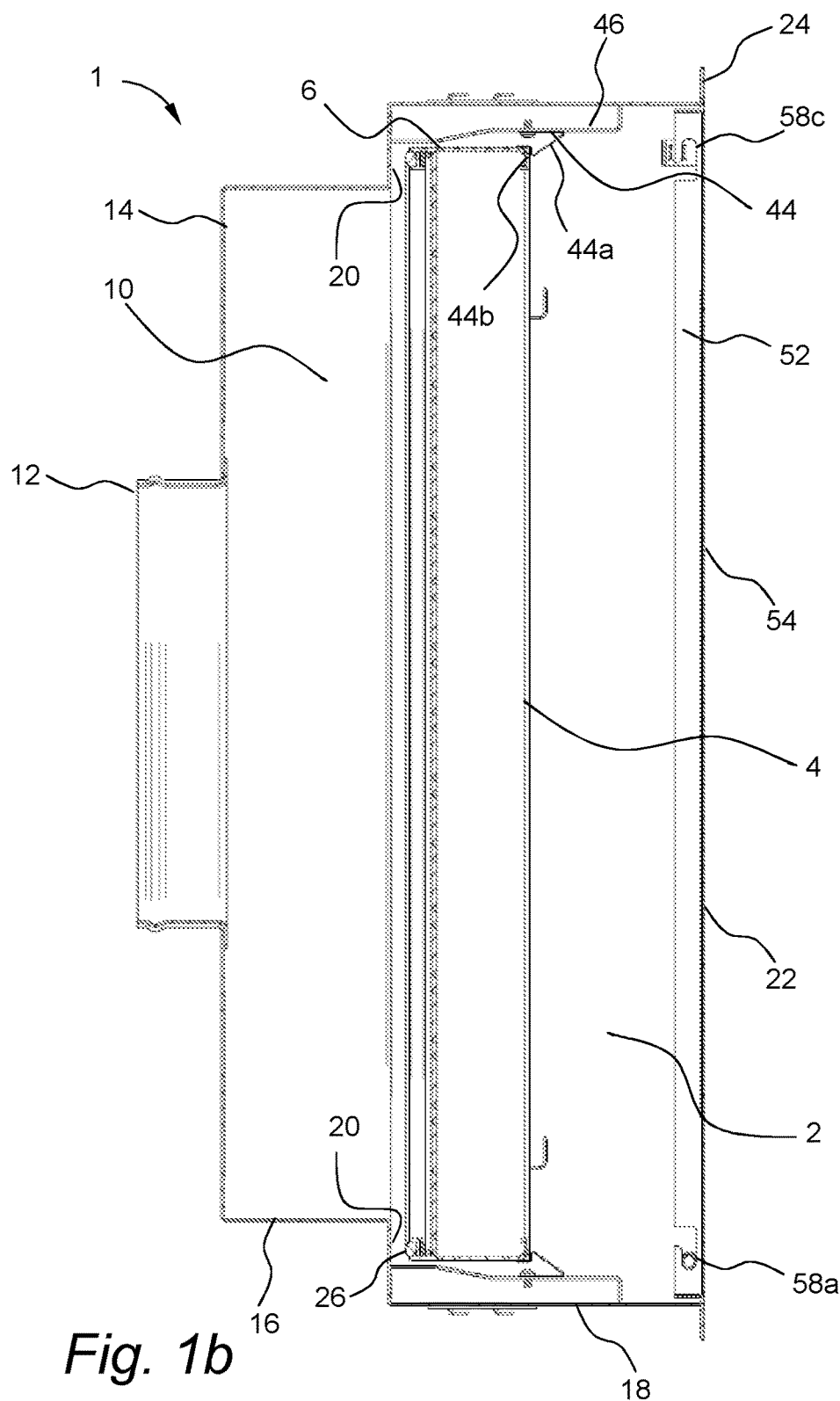
Figure 2:
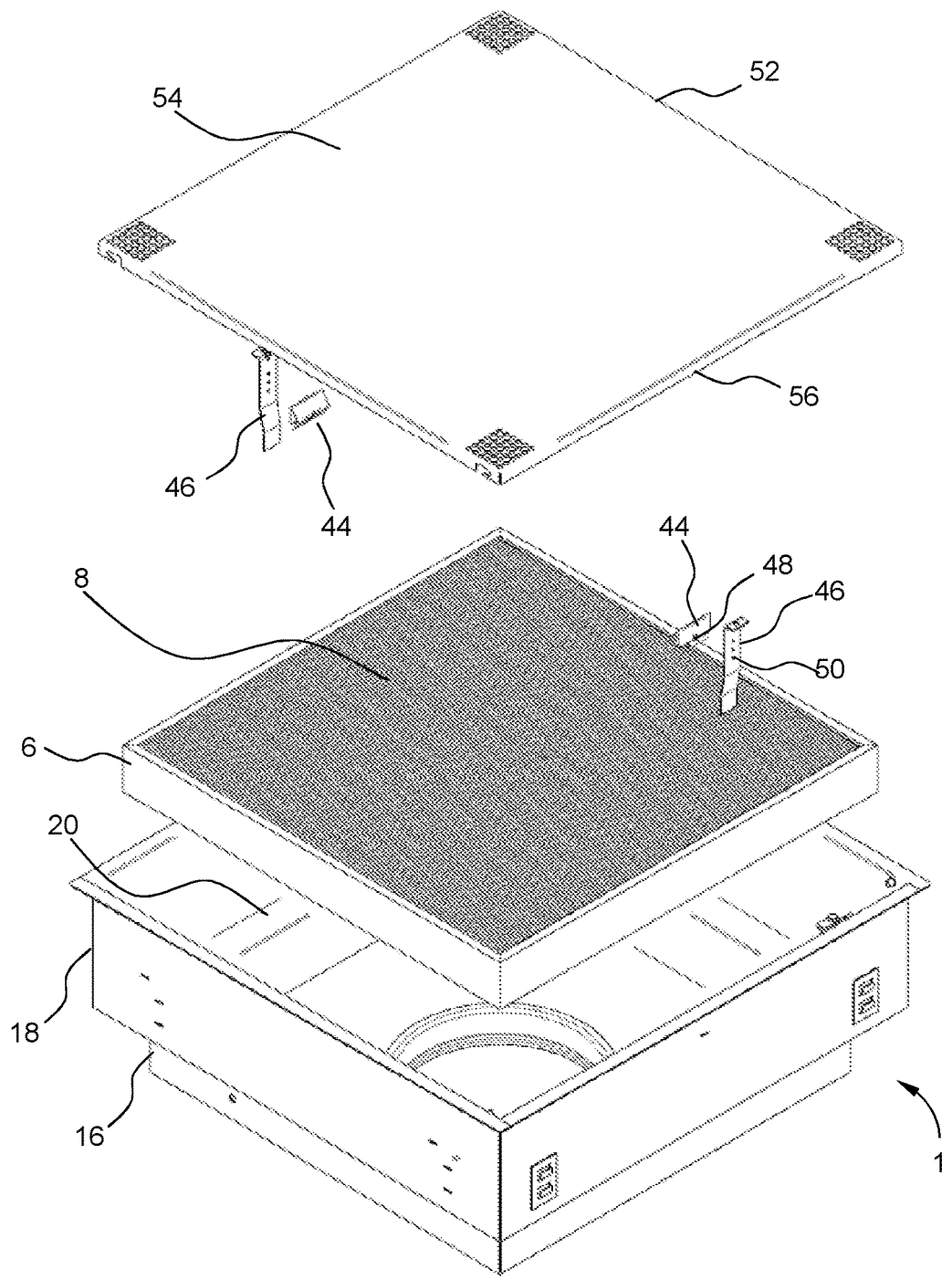
FIG. 2 is an exploded view of an embodiment of the filter housing.

Referring to the drawings, an embodiment of a filter housing in accordance with the present disclosure is shown in FIGS. 1a, 1b and 2. The filter housing 1 forms part of an air circulating system for a cleanroom. A lower portion 2 of the filter housing is adapted to house a panel type filter 4, having a frame 6 and a filter medium 8 held within said frame, which filters air supplied to the cleanroom. Accordingly, the filter housing 1 encloses the sides of a panel type filter 4. An upper portion 10 of the filter housing 1 defines a plenum over the filter for delivering air under pressure to the top side of the filter. The bottom side of the filter 4 is exposed to the interior of the cleanroom. Air is directed into the plenum portion of the filter housing through an inlet 12 located on a top 14 or side wall 16 of the upper portion 10 of the filter housing 1. The inlet is connected via a duct to a fan or blower (not shown) which transports air into the plenum. The air flows downwardly through the plenum and through the filter 4 into the cleanroom.

The filter housing can be fabricated from sheet metal, plastic or other common materials. The inlet 12 of the filter housing has a circular cross section and is connected to a top wall 14 of the filter housing. The top wall is joined to side walls 16 of the upper portion of the filter housing. The substantially vertical upper side walls 16 of the filter housing, defining the plenum, are connected to the substantially vertical lower side walls 18 of the lower portion 2 of the filter housing through a substantially horizontal sealing surface 20. The bottom side of the filter housing comprises a rectangular opening referred to herein as the mouth 22 of the filter housing. The lower side walls 18 and the horizontal plane of the sealing surface 20 together with the horizontal plane of the filter housing mouth 22, define a filter holding space capable of receiving the panel type filter 4. The filter housing 1 further comprises a mounting flange 24 which extends outwardly from the lower edge of the lower side walls 18, around the periphery of the mouth 22. The mounting flange 24 is used to for mounting the filter housing in a gridwork of a false ceiling (not shown).

The sealing surface 20 forms a continuous and integral sealing edge around the interior of the filter housing. The sealing edge is positioned so that it aligns with an upper edge of the filter frame 6. The panel filter 4 comprises a sealing material 26 disposed around the periphery of the frame 6 thereof such that the sealing material will be clamped to form a leak proof connection between the filter frame 6 and the sealing surface 20 of the filter housing when the filter is mounted. The sealing material 26 may comprise a polyurethane strip gasket which adheres to the filter frame. As will be described I detail below, the sealing material is clamped against the sealing surface so that a leak proof seal is achieved.

The panel type filter 4 is of standard design and is not specific to the present invention other than that it should be designed to fit in the filter housing. The filter is typically a panel type HEPA, ULPA or molecular filter comprising a rigid, substantially rectangular metal or plastic frame in which a filter medium is sealed. The exact filter grade is selected in accordance with the requirements and intended use of the cleanroom.

Panel type filters for use in the present filter housings typically vary in size from about 300 mm×300 mm to about 600 mm×600 mm square or 300 mm×600 mm to 300 mm×1200 mm rectangular. The thickness of the filters is typically in the range of 50 mm to 150 mm. However, filter sizes are not limited to the specified ranges. Other filter sizes are also possible. The panel filter frame typically has a substantially rectangular cross-section, but may also include one or more flanges extending around the periphery of the frame and configured to engage with structures inside of the filter housing mouth.

In an embodiment, the panel filter 4 comprises a sealing material 26 disposed around the periphery of the frame such that the sealing material will be clamped to form a leak proof connection between the frame and the filter housing when the filter is mounted.

In an alternative embodiment, the sealing material can instead be disposed on the sealing surface of the filter housing. The sealing material is often arranged in a suitable groove or channel in the frame or sealing surface structure.

Figure 3:
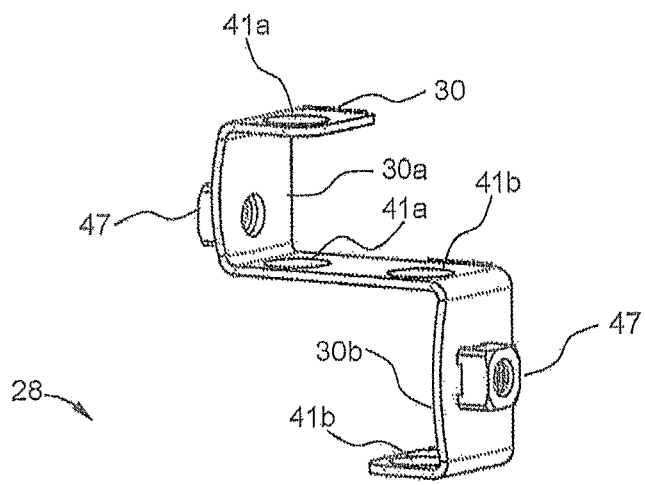
FIG. 3 is a perspective view of a clamping device.
Figure 3:
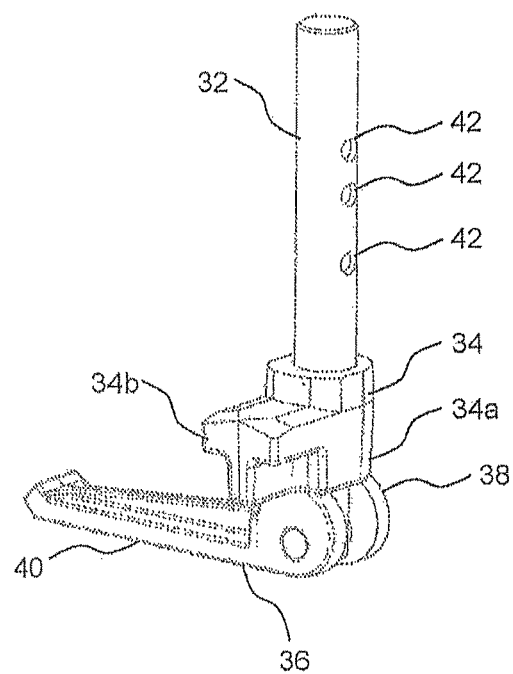

In order to clamp the filter in the filter housing a plurality of clamping devices 28 is used. In a preferred embodiment, the filter housing has four clamping devices arranged two and two on opposing lower side walls of the filter housing. Referring to FIG. 3, Each clamping device comprises a clamp holder 30, an axle 32 fixed in the clamp holder, a clamping portion 34 arranged at the axle such that it can rotate and move along a portion of the length of the axle, and a cam lever portion 36 arranged at an end of the axle comprising an excenter portion 38 and a lever portion 40 movable between an open and a closed position, such that when the lever 40 is moved from the open to the closed position the excenter portion 38 pushes the clamping portion 34 along the axle 32 towards the sealing surface 20.

The clamp holder 30 is typically fixed, for example welded or bolted, to the inside of a lower side wall of the filter housing in a position such that a predetermined distance between the sealing surface and the clamping portion in the open position can be obtained.

The axle 32 is preferably fixed releasably to the clamp holder 30, for example through cooperating holes 42, 47 in the axle and holder such that a suitable screw, pin or clip can be used to fix the axle to the clamp holder. The axle and/or the clamp holder may also have additional cooperating holes that allow the axle to be fixed to the clamp holder in different positions such that a number of different predetermined distances between the sealing surface 20 and the clamping portion 34 in the open position can be obtained. This allows for simple modification of the filter housing for use with panel filters having different filter thickness by changing the position of the axle in the clamp holder. The clamping device 28 and clamp holder 30 is readily accessible through the mouth of the filter housing.

The clamp holder 30 has a square leaning s-structure where the axle 32 can be inserted through holes 40a or 40b to be fixed either in the upper 30a or the lower half 30b of the structure. This configuration allows for a large variation in the predetermined distance between the sealing surface and the clamping portion. The axle can be fixed in the upper half 30a of the structure to accommodate filters with low filter thickness or in the lower half 30b of the structure to accommodate filters with high filter thickness. The axle may also comprise more than one hole 42 for fixing the axle to the clamp holder such that further predetermined distances between the sealing surface and the clamping portion can be obtained.

The clamping portion 34 comprises a central portion 34a arranged around the axle, and a protruding portion 34b extending radially relative to the axle. The clamping portion can be rotated around the axle between a locking position, where the protruding portion points in a direction substantially perpendicular to the adjacent filter housing wall, and a releasing position, where the protruding portion points in a direction substantially parallel to the adjacent filter housing wall. In the locking position, the protruding portion will overlap with a filter frame present in the housing such that when the cam lever 36 is moved from the open to the closed position, the excenter portion 38 will push the clamping portion 34 and the filter frame 6 towards the sealing surface 20. In the releasing position, the protruding portion will not overlap with a filter frame present in the housing such that the filter 4 can be readily removed.

The distance between the sealing surface and the clamping portion in the open position is preferably selected such that the clamping portion 34 can rotate freely when a filter of a predetermined thickness is inserted in the filter housing and held against the sealing surface.

The cam mechanism greatly facilitates the work associated with filter replacement. This in turn can reduce down time required for filter exchange as well as improve the working environment of the personnel tasked with the filter replacement. The cam mechanism does not involve any loose parts that can be dropped during work. The cam mechanism can be readily operated using only one hand. This allows for a more controlled clamping of the filter, which reduces the risk of mistakes or accidental damage to the new filter when it is being mounted. The cam mechanism can also be set to a predetermined clamping distance, the distance which the filter frame is displaced when the cam mechanism is activated, i.e. moved from the opened to the closed position. This allows for a uniform and predetermined sealing pressure between the filter frame and the sealing surface, not dependent on any manual tightening of nuts or bolts.

Figure 4A:
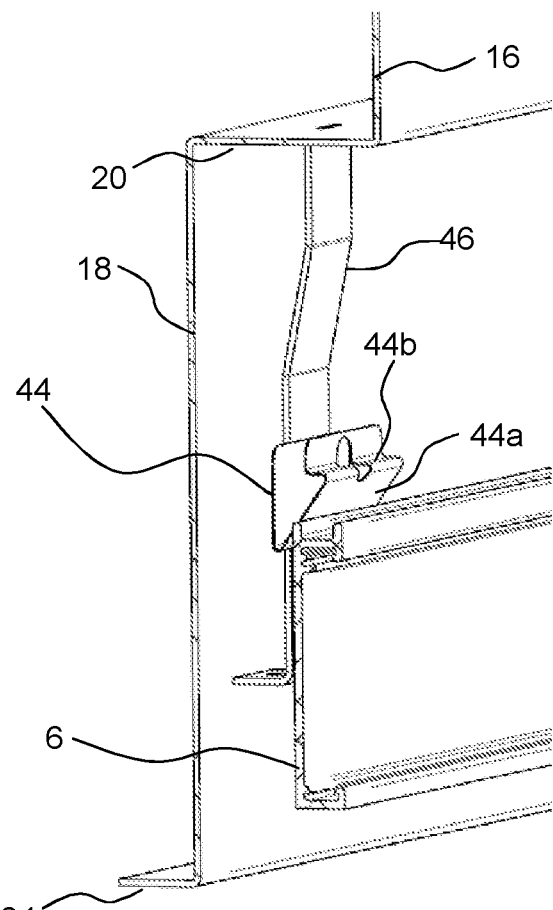
FIGS. 4a and 4b depict the function of the resilient member.
Figure 4B:
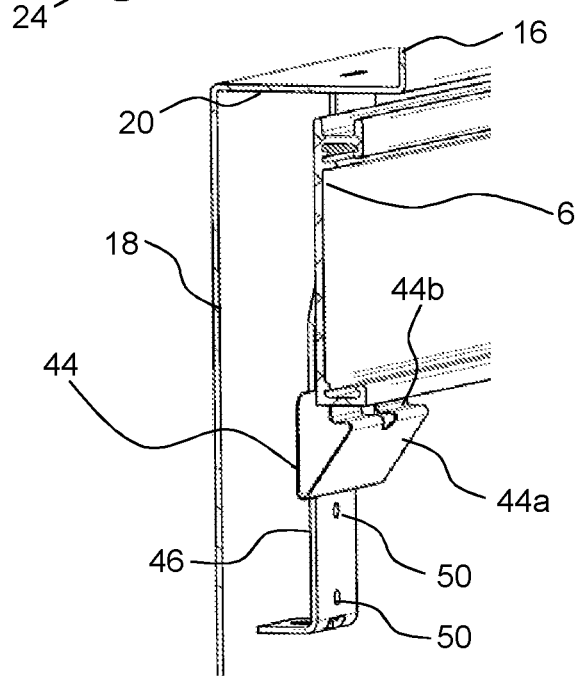

The filter housing further comprises at least one resilient member 44 fixed to the inside of a lower side wall 18 of the filter housing. Referring to FIGS. 4a and 4b, the resilient member 44 is arranged below the sealing surface 20 such that when a panel type air filter 4 is inserted into the mouth of the filter housing, the resilient member 44 will be deformed by the filter frame 6 as the filter passes the resilient member, and resume its original shape once the filter has passed, such that the filter is retained between the sealing surface 20 and the resilient member 44. The resilient member is preferably arranged in a position such that a predetermined distance between the resilient member and the sealing surface is obtained. Preferably, the distance between the resilient member and the sealing surface is selected such that the clamping portion 34 can rotate freely when a filter of a predetermined thickness is inserted in the filter housing and retained between the resilient member and the sealing surface.

The resilient member(s) 44 are configured to temporarily retain the filter in position for clamping and sealing before the filter is clamped in a sealing connection with the filter housing using the clamping means. This greatly facilitates the work associated with filter replacement. This in turn can reduce down time required for filter exchange as well as improve the working environment of the personnel tasked with the filter replacement. This allows for a more controlled clamping of the filter, which reduces the risk of mistakes or accidental damage to the new filter when it is being mounted. The resilient members are also functional during removal of the filter. During removal the resilient members act to receive the filter when clamping is released such that the filter can not fall or hang in a way that could otherwise cause damage to the filter housing. When clamping has been fully released, the filter may instead be removed in a controlled manner by depressing the resilient members.

The resilient member 44 is typically a plastic or metal element having a resilient portion capable of being deformed when pressure is applied and resuming its original shape when the pressure is removed. The resilient portion typically has a deflecting surface 44a and a retaining surface 44b on which the filter frame can rest once the filter frame has passed and the resilient member has resumed its original shape. The resilient portion is typically shaped such that it will deform to allow the filter frame to pass from below, but not from above, such that once the filter has passed the resilient member, it is retained between the sealing surface and the resilient member. When the filter is to be removed, the resilient member can be deformed manually to allow the filter to pass.

Referring to the embodiment in FIGS. 4a and 4b, the resilient member is composed of a resilient portion 44 and a holding portion 46. The holding portion 46 is fixed, for example welded or bolted, to the inside of a lower side wall 18 of the filter housing. The holding portion is fixed to the resilient portion. The resilient portion is preferably fixed releasably to the holding portion, for example through cooperating holes 48, 50 in the resilient portion and holding portion such that a suitable screw, pin or clip can be used to fix the resilient portion to the holding portion. The resilient and/or the holding portion may also have additional cooperating holes that allow the resilient portion to be fixed to the clamp holder in different positions such that a number of different predetermined distances between the sealing surface and the resilient portion in the open position can be obtained. This allows for simple modification of the filter housing for use with panel filters having different filter thickness by changing the position of the resilient portion. The resilient member is readily accessible through the mouth of the filter housing.

Referring to the embodiment in FIG. 2, the filter housing comprises two resilient members 44. The resilient members are arranged centrally at opposite sides of the mouth below the sealing surface such that when a panel type air filter is inserted into the mouth, both resilient members will be deformed by the filter frame as the filter passes the resilient members, and resume their original shape once the filter has passed, such that the filter is retained between the sealing surface and the resilient members.

The holding portion 46 further comprises a guiding surface 46b configured to guide the filter, when inserted into a proper position for clamping.

Figure 5:
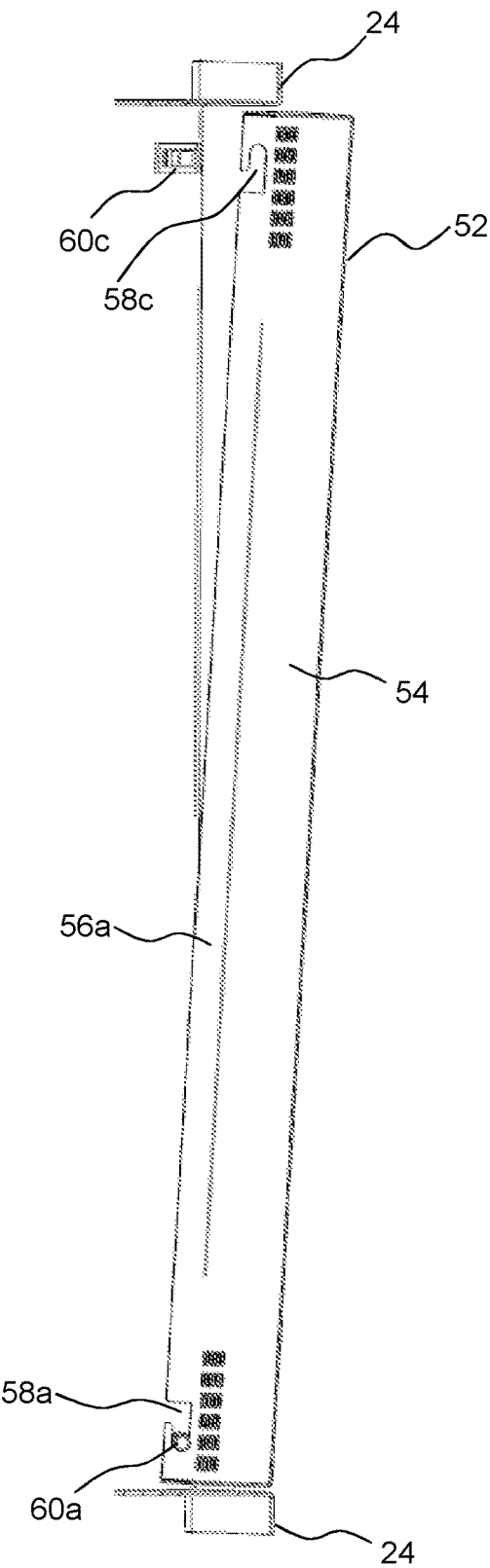
FIG. 5 is a perspective view of the grille.

Optionally, the filter housing 1 also comprises a grille 52 arranged horizontally at the filter housing mouth 22 and designed to protect the filter surface and/or to provide a more even distribution of the filtered air into the cleanroom. The grille comprises a perforated metal or plastic sheet 54 with dimensions substantially corresponding to the dimensions of the filter housing mouth 22. The grille further comprises side walls extending 56 vertically from the sheet 54 around the periphery thereof. The grille is suspended in the mouth of the filter housing such the plane of perforated sheet 54 is substantially aligned with the plane of the mounting flange 24 which extends outwardly from the lower edge of the lower side walls, around the periphery of the mouth. The grille is suspended by cooperating suspension means 58, 60 at the grille and filter housing wall. The suspension means 58, 60 comprise apertures in two opposing grille side walls 56a, 56b. Each of the opposing side walls comprises two apertures 58a, 58b, 58c, 58d, one close to each distal end of the grille side wall. All apertures may preferably be cut in the same shape, such that the orientation of the grille can be reversed. The suspension means further comprise protruding elements on two opposing filter housing side walls. Each of the opposing side walls comprises two protruding elements 60a, 60b, 60c, 60d, one close to each distal end of the filter housing side wall. The protruding elements 60a, 60b at one distal end comprise axles extending through the corresponding apertures such that the grille can pivot around the axles. The protruding elements 60c, 60d at the opposing distal end comprise resilient members. The resilient members are typically plastic or metal element having a resilient portion capable of being deformed when pressure is applied and resuming their original shape when the pressure is removed. The resilient portion typically has a deflecting surface and a retaining surface on which the grille can rest once the resilient member has resumed its original shape. Function of the grille is illustrated by FIG. 5. The resilient portion is shaped such that it will deform to allow the grille to pass from below, and the snap into the corresponding aperture such that the grille is locked in place. With this configuration the suspension means are substantially hid from view when the grille is in the closed position. When the grille is to be opened, the resilient members 60c, 60d can be deformed manually to allow the filter to pass. This is easily done by inserting a flat object, e.g. a credit card or similar, between the grille 52 and filter housing walls 18. The grille does not involve any loose parts that can be dropped during work. The provision of a substantially planar surface without any visible fastening means creating irregularities in the ceiling surfaces of the cleanroom is very advantageous since it facilitates cleaning.

The terms "filter housing" and "air filter housing" are used interchangeably herein. The terms "panel type air filter", "panel type filter" and "filter" are used interchangeably herein.

The term "ceiling" is used generally herein to denote the upper limit of a space. The space for example be a room, such as a cleanroom, or a smaller space, such as the inside of a controlled atmosphere bench unit.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An air filter housing for supplying air to a space, said air filter housing being configured to be arranged in a ceiling of said space,
    said housing having a mouth facing downward, said mouth comprising a sealing surface configured to receive a panel type air filter comprising a frame and a filter medium held within said frame, such that a sealing connection between said sealing surface and said frame is achieved, wherein said filter housing further comprises at least one clamping device for clamping the frame of the panel type air filter against the sealing surface, wherein said at least one clamping device comprises a cam mechanism configured to displace the frame when activating the cam mechanism, thereby providing clamping of said filter frame against the sealing surface, a clamp holder, and an axle fixed in the clamp holder, wherein the clamping device further comprises a clamping portion arranged at the axle such that the clamping portion can rotate and move along a portion of the length of said axle, and a cam lever portion arranged at an end of the axle comprising an eccentric portion and a lever portion movable between an open and a closed position, such that when the lever is moved from the open to the closed position the eccentric portion pushes the clamping portion along the axle towards the sealing surface.

2. An air filter housing according to claim 1, wherein said mouth comprises at least two clamping devices for clamping the frame of the panel type air filter against the sealing surface, wherein each of said clamping devices comprises a cam mechanism arranged to displace the frame when activating the cam mechanism, thereby providing clamping of said filter frame against the sealing surface.

3. An air filter housing according to claim 1, wherein the axle of the clamping device is adjustable between a first and a second fastening position in the clamp holder, whereby said first and second fastening position result in different distances between the clamping portion and the sealing surface, so as to accommodate panel type air filters having a first and second filter thickness respectively.

4. A method of mounting a panel type air filter in an air filter housing according to claim 1, comprising the steps of:
a) inserting a panel type air filter into the mouth of the air filter housing such that the filter frame abuts the sealing surface, and
b) clamping the frame against the sealing surface using the clamping device, such that a sealing connection between the frame and the housing is achieved.

5. An air filter housing according to claim 2, wherein the axle of the clamping device is adjustable between a first and a second fastening position in the clamp holder, whereby said first and second fastening position result in different distances between the clamping portion and the sealing surface, so as to accommodate panel type air filters having a first and second filter thickness respectively.

* * * * *